United States Patent [19]
Halpert et al.

[11] Patent Number: 5,137,540
[45] Date of Patent: Aug. 11, 1992

[54] COMPOSITE MONOLITHIC LAMP AND A METHOD OF MAKING THE SAME

[75] Inventors: Pinke Halpert, West Palm Beach, Fla.; Thomas O'Connell, Henderson, Nev.; Royce Platt, Okeechobee, Fla.

[73] Assignee: United Technologies Corporation, Hartford, Conn.

[21] Appl. No.: 624,786

[22] Filed: Dec. 4, 1990

Related U.S. Application Data

[63] Continuation-in-part of Ser. No. 320,204, Mar. 7, 1989, Pat. No. 4,975,225.

[51] Int. Cl.$^5$ .............................................. B24D 3/00
[52] U.S. Cl. ........................................ 51/293; 51/308; 51/309; 264/28; 264/54; 264/60
[58] Field of Search .................. 51/308, 309; 264/54, 264/60, 28

[56] References Cited

U.S. PATENT DOCUMENTS

| | | | |
|---|---|---|---|
| 2,893,102 | 7/1959 | Maxwell et al. | 25/156 |
| 3,512,571 | 5/1970 | Phelps | 164/37 |
| 3,770,044 | 11/1973 | Heath | 164/35 |
| 4,341,725 | 7/1982 | Eaver et al. | 264/86 |
| 4,428,895 | 1/1984 | Blasch et al. | 264/28 |
| 4,526,734 | 7/1985 | Enomoto | 264/28 |
| 4,770,672 | 9/1988 | Menard | 51/309 |
| 4,867,757 | 9/1989 | Payne | 51/309 |
| 4,883,778 | 11/1989 | SinghDeo et al. | 51/309 |
| 4,975,225 | 12/1990 | Vivaldi et al. | 264/56 |
| 5,035,725 | 7/1991 | Halpert et al. | 51/309 |

Primary Examiner—William R. Dixon, Jr.
Assistant Examiner—Willie Thompson
Attorney, Agent, or Firm—Peter R. Ruzek

[57] ABSTRACT

A composite yet monolithic free abrasive grinding lap includes a sintered porous matrix of ceramic or metal material and a quantity of silicon filler material, substantially completely filling the pores of the sintered porous matrix preform at least throughout an effective region of the lap that is to come in contact with a workpiece to be acted upon by the lap. The lap may further have a multitude of abrasive particles embedded in the filler material at the effective region. The lap is made by first slip-casting a preform, then freezing and freeze-drying the same, followed by lightly sintering the dry preform into a porous matrix preform, bringing the temperature of the preform to above the melting point of the silicon filling material, and filling the pores with the filling material in its molten state.

4 Claims, 1 Drawing Sheet

COMPOSITE MONOLITHIC LAMP AND A METHOD OF MAKING THE SAME

CROSS-REFERENCE TO RELATED APPLICATIONS

The present application is a continuation-in-part application of a commonly assigned patent application Ser. No. 07/320,204, filed Mar. 7, 1989, now U.S. Pat. No. 4,975,225.

DESCRIPTION

1. Technical Field

The present invention relates to the manufacture of ceramic articles in general and more particularly to the manufacture of grinding and/or polishing laps and similar tools.

2. Background Art

There are already known various constructions of laps for use in grinding and/or polishing, among them such especially suited for performing such operations on mirrors, lenses and similar optical components. Because of the relative delicacy of the components of this kind and the need to achieve as high a degree of accuracy as possible, both in terms of surface quality and figure conformity, such laps have to possess certain characteristics that greatly affect the material removal process from the workpiece and that have to be properly chosen for the respective application. One of such characteristics is the stiffness of the lap or a similar grinding and/or polishing tool. The stiffness affects the depth of penetration of the abrasive particles into the lap or tool and, correspondingly, the depths of the cuts made thereby in the workpiece. High stiffness results in deeper cuts with faster material removal, but also in greater damage, especially when the workpiece is of a brittle material. Stiffness of the tool also affects the figure control achieved during the material removal operation in that stiffer laps control the figure better than more compliant ones. Another one of the important characteristics is the thermal conductivity of the tool in that it affects the surface temperature of the workpiece which, in turn, affects the figure control and possibly even the chemistry of the material removal process. Yet another important characteristic is the hardness of the lap or similar tool in that it determines the extent to which abrasive particles adhere to the tool.

Experience has shown that it is very difficult if not impossible to satisfy all of the requirements for the grinding or polishing operation in a particular application with a monolithic lap, especially since at least some of the above requirements are contradictory to one another in the sense that a change in one of the characteristics to better satisfy one of the above requirements usually has a deleterious effect on the satisfaction of another requirement. Consequently, in the past, the monolithic lap or similar tool material selection was often a matter of compromise, weighing the importance of the various requirements against each other, and selecting the tool material for best achievable (but not ideal) performance. Typically, such compromise lap materials for use in grinding or polishing optical components are soft materials, such as pitch, that are charged with the desired abrasives, for example by pressing the soft material body of the respective lap against the workpiece with a layer of the abrasive being interposed between the body and the workpiece. In many instances, the soft material body has an increased overall rigidity imposed thereon by being mounted in or on a high-rigidity support or backing element. However, even this latter expedient does not overcome the deleterious effects of the relatively high yieldability of the lap body material at the region closest to the workpiece on the figure of, and on the penetration depth of the abrasive particles into, the workpiece.

On the other hand, it is known to mold refractory and metal shapes by slip-casting. So, for instance, the U.S. Pat. No. 4,341,725, issued on Jul. 27, 1982, discloses a slip-casting process wherein a nucleating agent is added to the slip prior to the casting and to the subsequent freezing of the cast preform in order to keep the sizes of ice crystals forming in the cast preform during the freezing of the latter at a level sufficiently low to avoid structural damage to the preform that would result if the sizes of the ice crystals were excessive. The only specific use that this patent describes for its method is in the context of making a simple tube of constant inner and outer diameters. Even though this patent mentions that other elements could also be produced by resorting to the same process, it should be evident that the sintered final products obtained by the process as disclosed in this patent, regardless of their shapes, would be totally unsuited for use as grinding or polishing tools for use in high-precision applications, such as those encountered with optical components.

Accordingly, it is the general object of the invention to avoid the disadvantages of the prior art.

More particularly, it is an object of the present invention to present a method of making relatively sturdy polishing or grinding tools, especially laps, which method does not possess the disadvantages of the prior art methods of this type.

Still another object of the present invention is so to develop the method of the above type as to improve the extent to which the tools made thereby satisfy the requirements placed on them.

It is yet another object of the present invention to devise a method of above type which results in grinding or polishing tools that are rigid enough, both locally and overall, to achieve excellent figure control of the workpieces acted upon by such tools at relatively high material removal speeds, and yet possess sufficient compliancy at their regions that are close to the workpiece during the grinding or polishing operation to properly entrain and embed the abrasive particles.

A concomitant object of the present invention is to provide grinding or polishing tools that have such characteristics as to satisfy the requirements placed on them better than previously proposed tools of this type.

DISCLOSURE OF THE INVENTION

In keeping with these objects and others which will become apparent hereafter, one feature of the present invention resides in a method of manufacturing a composite yet monolithic lap. This method includes forming an initial preform first by filling a mold cavity with a dense slip constituted of ceramic or metal particles in mixture with a liquid medium, followed by freezing the initial preform and freeze-drying the same to remove the liquid medium therefrom. Thereafter, the thus obtained dry preform is sintered, but only to such an extent that the larger ones of the particles are fused together but leave interconnected pores therebetween, and the thus obtained porous matrix preform is converted into the lap by bringing the porous matrix preform to a temperature above the melting point of a filler material that is pliable at temperatures within the operating range of the lap, and contacting the porous matrix preform with a quantity of the filling material in its molten state in such a manner that such molten filling material penetrates into the pores of the porous matrix preform at least to an extent needed to substantially completely fill the pores of an effective region of the lap that is to come in contact with a workpiece to be acted upon by the lap.

BRIEF DESCRIPTION OF THE DRAWING

The present invention will be described in more detail below with reference to the accompanying drawing in which.

BEST MODE FOR CARRYING OUT THE INVENTION

Figure 1:
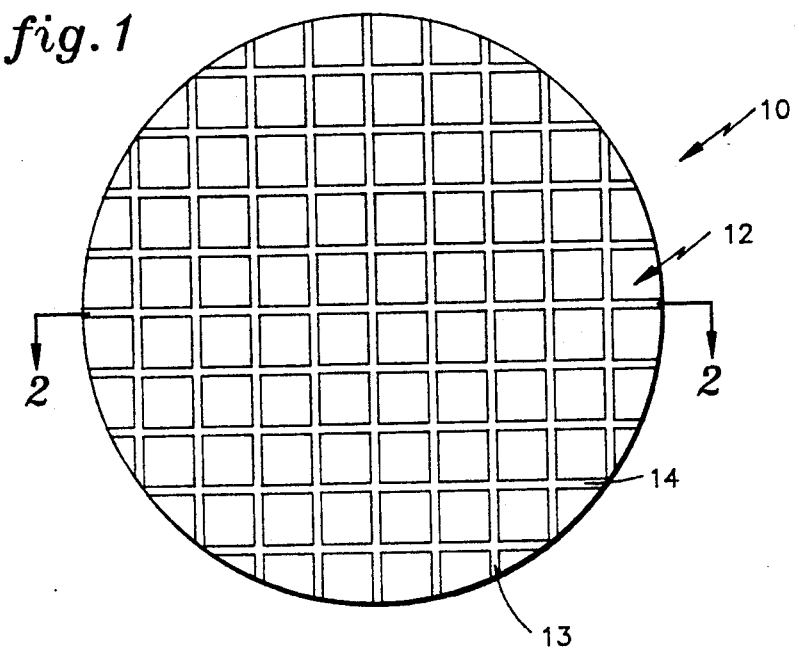
FIG. 1 is a plan view a lap in accordance with the present invention showing an effective region of the lap.

Referring now to the drawing in detail, it may be seen that the reference numeral 10 has been used therein to identify a grinding or polishing lap of the present invention in its entirety. The lap 10 is shown to have a configuration of a circular disk. As will become apparent from a comparison of FIGS. 1 and 2, the lap 10 as illustrated is provided, at a region 11 of its exposed major surface 12 that faces the observer in FIG. 1 of the drawing, with two orthogonal arrays of substantially equidistant grooves 13 and 14 which intersect each other and penetrate only to a certain depth, which corresponds to that of the region 11, below the exposed major surface 12 to thus subdivide the region 11 into a multitude of raised portions or mesas 15 of substantially square outlines. As shown in particular in FIG. 2 of the drawing, the grooves 13 and 14 subdivide the exposed major surface 12 into respective exposed surfaces 16 of the mesas 15 which face a respective workpiece 20 to be polished or ground when lap 10 is in its position of use.

Figure 3:
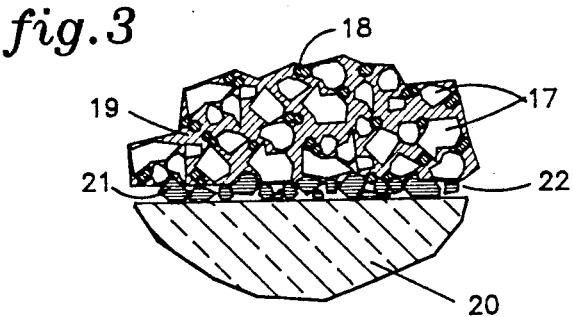
FIG. 3 is a further enlarged view showing a detail 3—3 of FIG. 2 and especially the an internal structure of the effective region of the lap.

Having so described the depicted configuration of the lap 10, the internal structure thereof, and a currently preferred method by which such internal structure is obtained, will now be discussed first in general terms with particular reference to FIG. 3 of the drawing.

As a first step, a "green" preform of the lap 10 is produced by slip casting, of which an example is disclosed in the above-mentioned U.S. patent to which reference may be had for further details of the slip casting process as such. The expression "slip casting" is being used herein to indicate a process in which a pourable slip consisting of metal, ceramic, or carbon powders or mixtures of such powders and a liquid (usually water) is poured in a non-absorbent mold, the mixture is frozen, removed from the mold and eventually freeze-dried to obtain a "green-state" body ready for firing.

The powders contained in the slip used in the performance of the method of the present invention preferably consist of larger particles 17 and smaller particles 18 in intimate mixture with one another. The "green" preform obtained from the slip-casting process as described so far is then lightly sintered, that is, sintered to such an extent that only the smaller particles 18 melt and subsequently solidify to connect the larger particles 17 with one another to form a relatively stable, yet still somewhat brittle, porous matrix of the kind illustrated in FIG. 3. After the thus sintered preform or matrix body of the lap 10 is obtained, it is contacted with a pore filling material 19 that is solid yet relatively soft or compliant with respect to the matrix material at all temperatures encountered at the region 11 during the use of the lap 10, in such a manner that the pore-filling material 19 in its molten state penetrates or wicks into the pores or interstices present between the sintered particles 17 and 18, at least to such an extent as to permeate the region 11 but typically to substantially completely fill the pores or interstices throughout the sintered preform, thus converting such preform into the lap 10.

The grooves 13 and 14 may be provided in the "green" preform during the slip-casting process, for instance as a result of the presence of ridges or ribs in the casting mold that penetrate into the internal space of the mold. However, the grooves 13 and 14 can also be formed at any later stage, such as after the sintering or even later, by resorting to a material removal operation, such as milling. Subsequently to the conversion of the sintered preform into the lap 10, the region 11 is machined to remove a relatively thin layer of material from the mesas 15 and thus to form their exposed surfaces 16, mainly to give the exposed major surface 12 of the lap 10 its desired, such as planar, configuration and also to improve the surface quality of the exposed surfaces 16 of the mesas 15.

Thereafter, the region 11 of the lap is charged with abrasive particles 21, for instance, by pressing the region 11 of the lap 10 with a predetermined force against a layer of such abrasive particles that is supported on a support of a configuration generally conforming to that of the major surface 12. However, this abrasive particle charging may also take place automatically during the actual grinding or polishing operation in that a layer 22 of such particles 21, by themselves or in mixture with or suspension in a carrier medium such as a cooling medium or paste, is formed on the surface of the workpiece 20 that is to be acted upon, and the lap 10 is pressed against the layer 22. In any event, the pressure exerted by the lap 10 on the respective layer, such as 22, of the abrasive particles 21 causes such particles 22 to become embedded in the region 11 of the lap 10, and more particularly in the relatively soft pore-filling material 19. After the particles 21 have been so embedded in the region 11, the lap 10 can be used for polishing or grinding the surface of the workpiece 20 that faces the exposed surface 12 of the lap 10, in that the embedded abrasive particles 21 abrade the material of the workpiece 20 in a manner that can be perceived from FIG. 3 of the drawing. The pressure exerted during the use of the lap 10 and/or the size of the particles 21 are then determinative of the depth of penetration of the embedded abrasive particles 21 into the workpiece 20, and thus of the achieved surface quality of the latter and, consequently, of the classification of the abrading operation either as a grinding operation or as a polishing operation.

EXAMPLE 1

Figure 2:
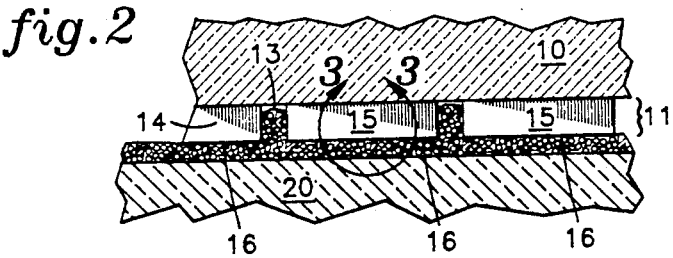
FIG. 2 is a cross-sectional somewhat enlarged view of a fragment of the lap taken along line 2—2 of FIG. 1, in juxtaposition with a portion of a workpiece being acted upon by the lap.

A composite silicon carbide/pitch lap of the type shown in FIG. 1 was formed as follows:

A batch of casting slip was prepared by mixing the following materials in the quantities shown, and rolling in a jar mill for for about 27 hours:

| | |
|---|---|
| Silicon Carbide powder (F-320) | 5,773.8 g |
| Silicon Carbide powder (−1.0 m) | 4,220.0 g |
| Water | 1,313.7 g |
| Sodium Silicate | 34.8 g |
| Dimethyl Sulfoxide | 205.3 g |

The casting slip prepared as described above was introduced into an appropriately shaped mold cavity of an assembled multipartite mold through a feed port, and the air displaced thereby escaped from the mold cavity through an escape port. The mold and the slip were vibrated both during the fill and for 15 minutes thereafter, to free entrapped air.

The still assembled mold and its contents were placed in a refrigerated compartment stabilized at −85° C. and allowed to remain for about 30 minutes. The mold and its contents were subsequently removed from the refrigerated environment, and the mold portions were disassembled to free the frozen "green" preform. The frozen preform was allowed to equilibrate at a temperature of −85° C. for about 1 hour.

Thereafter, the frozen casting was converted in steps into the final product or lap 10 by being first placed in a chamber which was evacuated to approximately 100 m of Hg at room temperature. The vacuum pumping was continued for nearly 16 hours when the vacuum level discernibly increased to less than 50 m of Hg, indicating that the freeze-dying (sublimation) process had been substantially completed and that the casting could be considered dry. The dried casting was lightly sintered by subjecting it to 2050° C. in a partial pressure of argon atmosphere.

The interstices or pores of the thus partially sintered porous preform was filled with pitch in the following manner: first, the circumferential surface of the perform was covered by attaching aluminum foil or tape thereto, in order to avoid escape of pitch thereat during the pore-filling operation. Then the preform was heated to a temperature exceeding the melting temperature of the pitch (which, depending on the exact composition of the pitch within the composition range known to be suited for use in polishing or grinding operations, is in the range of about about 95° to 120°), placed on an upwardly facing surface of a heat sink bottom plate of aluminum with the mesa region being on top, and molten pitch was poured onto and spread over the entire top region of the preform to flow into and through the pores of the sintered matrix. Any pitch reaching either the circumferentially arranged aluminum tape or foil, or the heat sink bottom plate, froze or solidified almost immediately upon contact, thus plugging the respective pore and preventing outflow of pitch therethrough, without interfering with the flow of the pitch into or through other internal pores. Finally, the thus pitch-permeated preform was allowed or caused to cool below the melting temperature of the pitch, resulting in solidification of the remainder of the pitch, and the preform was removed from the bottom plate and the circumferential tape or foil was stripped, therefrom, thus making the preform ready for subsequent machining or other operations of the kind mentioned before.

EXAMPLE 2

The above procedure was followed in the making of a composite silicon carbide/lead lap, except that the sintered preform was brought up (such as preheated) to a temperature exceeding the melting temperature of lead (approximately to 375° C.) prior to the pouring of molten lead onto and spreading the same over the top surface of the preform.

In each case, the resultant article or lap was a composite yet, in effect, monolithic, relatively high stiffness structure that, however, because of the presence of the relatively pliable pore-filling material, such as pitch or lead, at the surface 12, was able to accept and entrain at least some of the abrasive particles 21, by embedding the same, for such embedded particles to perform or at least participate the actual material-removing function on the workpiece 20.

While the present invention has been illustrated and described as embodied in a particular construction of a polishing or grinding lap charged with embedded abrasive particles, it will be appreciated that the present invention is not limited to this particular example; rather, the scope of protection of the present invention is to be determined solely from the attached claims.

We claim:

1. A composite yet monolithic lap, obtained by a method comprising the steps of
    forming an initial preform, including filling a mold cavity with a dense slip constituted of ceramic or metal particles in mixture with a liquid medium;
    freezing the initial preform;
    freeze-drying the initial preform to remove the liquid medium therefrom;
    sintering the thus obtained dry preform only to such an extent that the larger ones of the particles are fused together but leave interconnected pores therebetween; and
    converting the thus obtained porous matrix preform into the lap, including bringing the porous matrix preform to a temperature above the melting point of a filler material that is pliable at temperatures within the operating range of the lap to embed abrasive particles thereinto, the contacting the porous matrix preform with a quantity of the filling material in its molten state in such a manner that such molten filling material penetrates into the pores of the porous matrix preform at least to an extent needed to substantially completely fill the pores of an effective region of the lap that is to come in contact with a workpiece to be acted upon by the lap.

2. The lap as defined in claim 1, wherein the method further comprises the step of embedding abrasive particles in the filler material at the effective region, pressing the effective region and the abrasive particles against one another.

3. A composite yet monolithic lap, comprising
    a sintered porous matrix of ceramic or metal material; and
    a quantity of filler material, which is pliable at temperatures within the operating range of the alp to embed abrasive particles thereinto, said filler material substantially completely filling the pores of the sintered porous matrix preform at least throughout an effective region of the lap that is to come in contact with a workpiece to be acted upon by the lap.

4. The lap as defined in claim 3, and further comprising a multitude of abrasive particles embedded in the filler material at the effective region.

* * * * *

UNITED STATES PATENT AND TRADEMARK OFFICE
CERTIFICATE OF CORRECTION

PATENT NO. : 5,137,540

DATED : August 11, 1992

INVENTOR(S) : Pinke Halpert, Thomas O'Connell, Royce Platt

It is certified that error appears in the above-identified patent and that said Letters Patent is hereby corrected as shown below:

On the Title page, item [54] and col. 1, line 1
IN THE TITLE

"Composite Monolithic Lamp And A Method Of Making the Same" should read

--COMPOSITE MONOLITHIC LAP AND A METHOD OF MAKING THE SAME--

Signed and Sealed this

First Day of February, 1994

*Attest:*

BRUCE LEHMAN

*Attesting Officer*     *Commissioner of Patents and Trademarks*